(No Model.)

H. F. HOGAN.
LOCOMOTIVE HEAD LIGHT.

No. 372,264. Patented Oct. 25, 1887.

WITNESSES
D. Fugitt.
P. C. Masi.

INVENTOR
H. F. Hogan
by E. W. Anderson
his Attorney

United States Patent Office.

HUGH FRANKLIN HOGAN, OF ALBION, INDIANA, ASSIGNOR OF ONE-HALF TO WILLIAM D. GLEASON, OF PARK MANOR, ILLINOIS.

LOCOMOTIVE HEAD-LIGHT.

SPECIFICATION forming part of Letters Patent No. 372,264, dated October 25, 1887.

Application filed March 18, 1887. Serial No. 231,419. (No model.)

*To all whom it may concern:*

Be it known that I, HUGH FRANKLIN HOGAN, a citizen of the United States, and a resident of Albion, in the county of Noble and State of Indiana, have invented certain new and useful Improvements in Locomotive Head-Lights; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
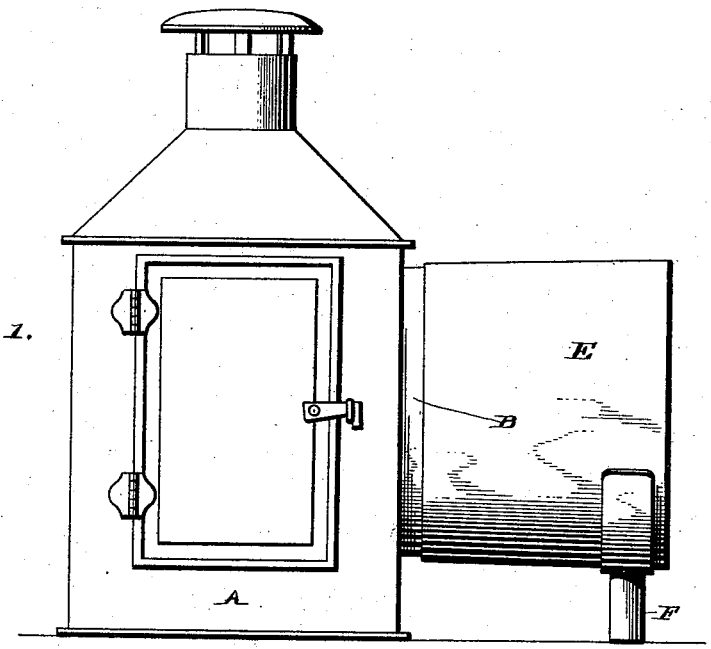
Figure 2:
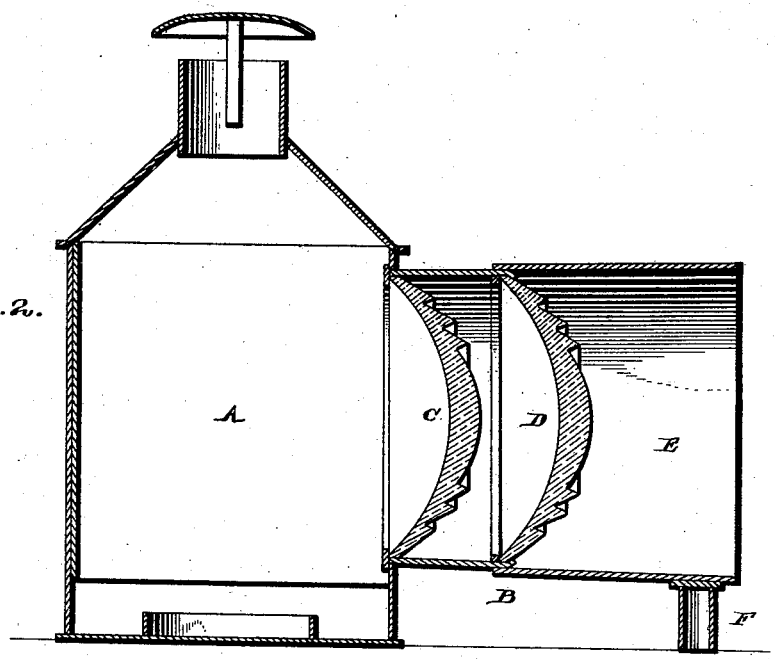

Figure 1 of the drawings is a side elevation of my improved locomotive head-light. Fig. 2 is a vertical longitudinal section of the same.

The invention relates to improvements in locomotive head-lights; and it consists in the construction and novel combination of parts, as hereinafter set forth.

Referring to the drawings by letter, A designates the lamp-case, and B the lens-tube secured to and standing out from one side thereof. At the outer end of the tube B is seated the lens D, preferably a Fresnel lens, and at the inner end of the tube is seated the similar lens C. The lenses are fixed, both with relation to the lamp and to each other, and are so situated that they will throw outward a beam of light with widely-diverging rays, so as to give light on each side of the track.

E is a tubular reflector, having the reflecting-surface on its inner side, and is preferably made slightly conical. The reflector E is supported by the foot F, and is adapted to slide in and out on the lens-tube B.

F is a foot to support the tube E at its outer end. The reflector also serves as an outside protection for the lenses.

The operation of the invention is as follows: When the locomotive is traveling on one of a labyrinth of tracks, the reflector is drawn outward till the light from the lenses is concentrated by its reflecting-surface, producing an illuminated area having a highly-illuminated central portion, which illuminates the track upon which the locomotive is traveling, so that obstructions thereon are readily seen.

When in the country, the reflector is pushed back, allowing the rays from the lenses to diverge and illuminate each side of the road as well as the track.

I am aware that lenses in telescopes and other optical instruments have been set in tubes sliding one within the other for the purpose of focusing the instrument. I am also aware that a lens set in a sliding tube has been used with lanterns, the object being to bring the light of the lantern to a suitable focus. I do not claim either of said constructions.

Having described my invention, I claim—

1. In a locomotive head-light, the combination, with the lantern, of a number of fixed lenses situated at suitable distances apart, and a sliding tubular reflector having its reflecting-surface on its inner side for the purpose of concentrating the diverging rays of light from the lenses and varying the area and intensity of light, substantially as specified.

2. The combination, in a locomotive head-light, of the lantern A, the fixed lenses C and D, seated at a proper distance apart in the lens-tube B, and the tubular reflector E, sliding on the lens-tube, as and for the purpose specified.

In testimony whereof I affix my signature in presence of two witnesses.

HUGH FRANKLIN HOGAN.

Witnesses:
GEO. C. LAZEAR,
G. H. NICHOLS.